June 25, 1946.   C. W. HAGGART   2,402,748
SAFETY CONTROL FOR HYDRAULIC BRAKE SYSTEMS
Filed Dec. 20, 1943
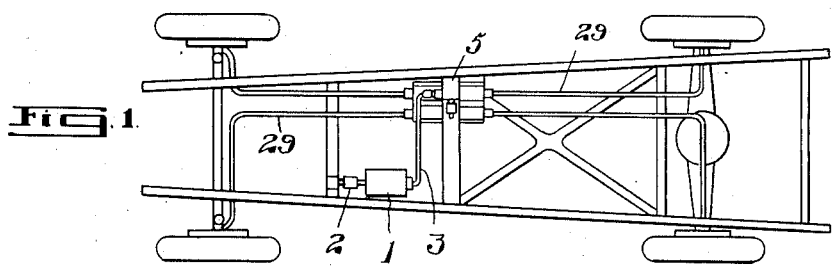
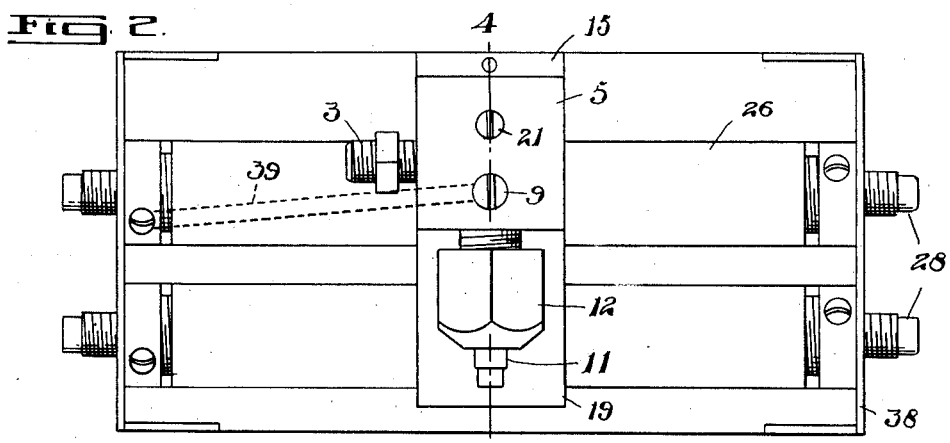
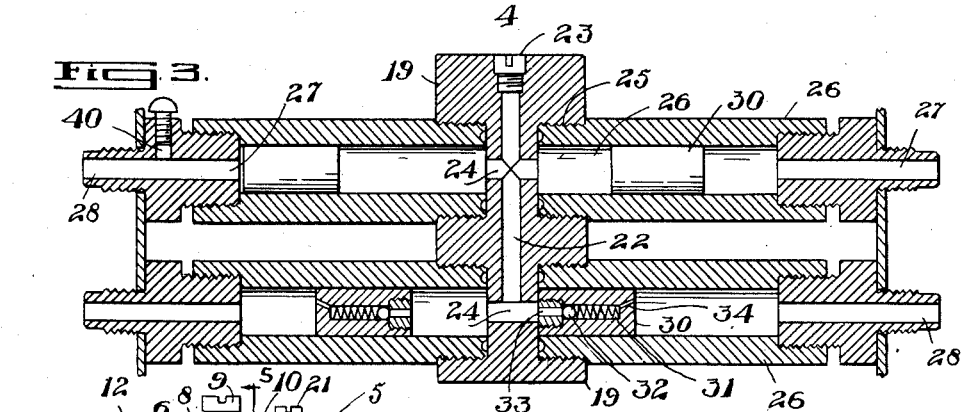
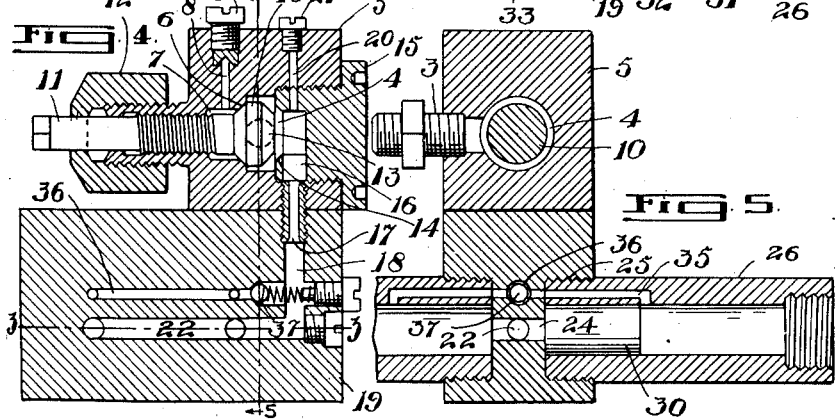
Inventor.
C. W. Haggart
by
[signature]
atty.

Patented June 25, 1946

2,402,748

UNITED STATES PATENT OFFICE 2,402,748

SAFETY CONTROL FOR HYDRAULIC BRAKE SYSTEMS

Crichton W. Haggart, Toronto, Ontario, Canada, assignor of one-third to John C. Urquhart, Toronto, Ontario, Canada Application December 20, 1943, Serial No. 515,048

5 Claims. (Cl. 303—84)

The present invention is particularly adapted to the braking systems of automotive vehicles, though it may be applied to other hydraulic systems where conditions similar to those found in automotive equipment are met.

Hydraulic systems at present in use are subject to failure of the entire system through a leak occurring in one branch, such for instance as in one wheel of a vehicle, and the principal object of this invention is to provide a safety device to be introduced into a hydraulic system which will permit the system to operate normally in every respect, and when a leak or break occurs in any branch of the system the faulty branch will be automatically isolated, thereby enabling the remaining portions of the system to operate normally.

A further object of the present invention is to provide a system which will allow slight operational fluid loss in different branches without impairing the system as a whole, and further, to provide a safety device in which all the parts will have the same co-efficient of expansion.

A further object is to provide a safety device which will allow the complete and easy removal of all air in the system and in which there will not be sufficient friction in the operating parts to disturb the proper equalizing of the pressure.

A still further object is to provide a system which can be bled and the device placed in operation in the minimum of time.

The principal features of the invention consist in the novel arrangement of individual cylinders in each branch of a hydraulic system, which cylinders are connected through a common duct to the operating or master cylinder, and individual pistons are arranged within each of said cylinders which will, through excessive leakage in any branch, automatically close the same to retain the fluid in the master cylinder and other branches from loss and operative impairment.

A further important feature consists in the novel provision of means whereby excess fluid, due to expansion, will be by-passed back to the master cylinder and reservoir.

A still further and important feature consists in the novel arrangement of passages through the valving pistons with check valves to compensate for fluid losses or contraction in the branches of the system.

A still further important feature consists in the novel provision of a control valve in the conduit connecting the master cylinder with the piston valve containing branch cylinders to enable the system to be bled to remove air therefrom.

In the accompanying drawing

Figure 1 is a diagrammatic plan view of the chassis of a motor vehicle showing the application of my invention thereto.

Figure 2 is an enlarged plan view of the safety unit made in accordance with this invention.

Figure 3 is a horizontal plan section through the unit taken on the line 3—3 of Figure 4.

Figure 4 is a vertical transverse sectional view taken on the line 4—4 of Figure 2.

Figure 5 is a vertical section taken on the line 5—5 of Figure 4.

In the installation of an equipment embodying the present invention in a motor vehicle, as illustrated in the accompanying drawing, a master cylinder 1, suitably mounted in the frame of the vehicle and having an operating pedal 2, is connected by a conduit 3 with a valve chamber 4 formed in a block 5.

Within the block 5 and at one side of the entrance thereto of the conduit 3 is a valve seat 6 leading to a passage 7 which communicates with an escape duct 8 leading out through the top of the block 5 and which is closed by a threaded sealing plug 9.

A valve 10 arranged within the valve chamber 4 has a bevelled surface to engage the seat 6, the stem of the valve extending through the passage 7 and being threaded in a threaded orifice in the block.

The outer end of the valve stem 11 is sealed with a packing nut 12. The inner end of the valve 10 is provided with a bevelled surface 13 which is adapted to engage a bevelled seat 14 arranged in a plug 15 screwed into the block 5 and which encloses the valve chamber 4.

A lateral passage 16 in the plug 15 leads radially outward through the block 5 and communicates through a ferrule 17 with a passage 18 arranged in a block 19 which forms part of or is secured to the block 5.

A duct 20 leads from the recess in the plug 15 outside of the valve chamber 4 and this is closed with a screw plug 21.

The passage 18 extending downwardly from the valve chamber communicates with a transverse passage 22 in the lower block 19 which is closed at the outer end by a screw plug 23.

A pair of lateral passages 24 connected with the passage 22 open into threaded recesses 25 arranged in opposite sides of the block 19. Secured in each of the threaded recesses 25 is a cylinder 26, each of which communicates with the transverse passage 24 connected with the valve chamber 4, and the outer end of each cylinder is closed with a tubular plug 27, each of which has a pipe connection nipple 28 to which the branch pipes 29 of the braking system are connected.

Within each of the cylinders 26 is arranged a piston 30 which is adapted to be moved with the flow of fluid pressure applied from the master cylinder 1, flowing through the conduit 3, valve chamber 4 and passages 18, 22 and 24.

Each of said pistons is formed with an axial recess 31 housing a spring-held ball check valve 32 which engages the opening in a ferrule 33 in the inward pressure end. A small bleed opening 34 extends from the other end of the recess 31 and communicates with the interior of the cylinder.

Ports 35 are arranged in the wall of the cylinders 26 at their inward ends and open into the cylinder at a point just beyond the outward end of the piston when the piston is at the innermost end of its stroke. The ports 35 communicate with a transverse duct 36 in the block 19 arranged above the passage 22, and this transverse duct opens into the vertical passage 18 but is closed against admission of pressure fluid thereto from the duct 18 by a spring ball check 37.

The entire unit described is preferably mounted in a plate retainer 38, as particularly shown in Figure 2. This unit is rigidly mounted on the frame of the vehicle at a level position and connected with the master cylinder. Fluid is then pumped into the unit by means of the operating pedal and the pistons 30 are held in position by the use of a suitable rod until fluid runs freely out of the outer end of the cylinder. This removes air from inside the piston and from any of the ducts and ports.

Each wheel cylinder branch 3 is then connected to the outer nipple ends of the individual cylinders.

The valve 10 is then turned clockwise until its inner end is firmly seated against the seat 14.

A short length of pipe 39, indicated by dotted lines in Figure 2, is connected between the duct 8 in the block 4 and a port 40 at the outer end of one of the cylinders, and while the connection of the conduit 3 leading to the wheel cylinder is connected to the wheel cylinder and the wheel cylinder is adjusted to be allowed to bleed, fluid is pumped into the port 40 to fill the outer end of the cylinder 26 and the conduit 3 and the wheel cylinder to exclude all air. The wheel cylinder is then sealed and the branch thus treated will be completely filled with fluid exclusive of air.

This process is repeated with each branch of the system until it is all completely filled. The auxiliary pipe 39 is then removed and the duct 8 is sealed by returning the screw plug 9, and each of the ducts 40 is sealed with a suitable plug.

Upon the completion of the filling of the system with fluid the valve 10 is then turned anti-clockwise to open the valve chamber 4 to communicate with the passages 16 and 18, and the valve is brought into engagement with the outer seat 6 of the valve chamber, thus completely sealing the oil chamber.

The system when thus filled will of course be properly tested for leaks, and providing the system is properly sealed it is then ready for operation. In the event of air entering the system through the master cylinder it will be necessary to bleed the entire system and fill with fluid to ensure that there will be no entrapped air.

It will be remembered that in the setting of the system the pistons 30 are located midway of the length of each of the cylinders 26, and in the operation of the brake pedal and master cylinder, pressure applied to the fluid causes the pistons 30 to oscillate back and forth within the cylinders. The outward movement of the pistons forces fluid from the outer ends of the cylinders to the wheel cylinders, thereby operating the brakes.

It will be understood that in normal operation the sliding piston valves will not be forced to the ends of the cylinders as the wheel brakes will be fully applied when the pistons are in an intermediate position. If, however, there should be loss of fluid in any one branch of the system the piston in that branch will, upon application of pressure through the master cylinder, travel to the end of the cylinder, and close the passage. This action is instantaneous and the pressure on the fluid will operatively affect the remaining normally operating branches, while the one in which a leak has taken place will be cut off.

If excess expansion takes place in the fluid in any one branch the piston valve will move inwardly toward the block 19 and, on reaching the inward end, it will open the port 35, allowing the excess fluid to flow into the port 35 and back to the passage 18 past the ball valve 37, thereby returning to the master cylinder.

Compensation for fluid losses and fluid contractions between and including the sliding piston valves and the wheel cylinders, is accomplished through the ball check valve and metering hole in each of the pistons 30. During the normal operation of the unit fluid is forced through the ball check valve and metering hole in the pistons when the brake pedal is being depressed, and the amount of fluid which passes through the pistons is more than is required to make up for the fluid volume loss. Upon the release of the pedal the wheel cylinder forces the fluid to return to the unit and master cylinder, and as the piston contains a check valve the fluid cannot return through the piston, consequently the increase in volume of the returning fluid forces the piston all the way back to the central block or distributor body and the excess fluid escapes through the expansion port which is uncovered by the piston.

A device as herein described has been thoroughly tested and found to operate satisfactorily with a pressure of 2000 lbs. per square inch and higher pressures may be used if found desirable.

The unit may be constructed entirely of the same metal so that it will have a unitary co-efficient of expansion. All the parts are of metal and they will not be affected by the fluid and there will be no cause of failure because of the use of materials other than metal.

The design of unit herein illustrated and described enables the easy and simple removal of all air from the entire system, and it will be noted that in bleeding the unit the flow is continuously upward, making it impossible to trap air in any part thereof.

The form of valve 30 for sealing the system renders it leak-proof under operating conditions.

The device is simple and the number of operating parts is reduced to the minimum, and there are no parts to wear to any material extent and whatever wear may occur through long and constant use will not affect in any manner the security and accuracy of the device. Any additional clearance of the sliding piston valves will not harm the operation but will add to the compensating effect from fluid losses.

The construction of the unit as herein described will permit any part thereof to be serviced or removed without disturbing the remaining construction.

What I claim as my invention is:

1. In a safety device for branched hydraulic systems, the combination with a plurality of branches and a master cylinder, of a block having a conduit connected with the master cylinder, said conduit having a plurality of branches, cylinders mounted in said block and having their inner ends communicating with the branches of said mean conduit and their outer ends communicating each with one of said system branches, pistons operating in said cylinders and adapted on engaging the ends of the cylinders to close the flow of fluid thereto from the master cylinder, a valve block mounted on the aforesaid block formed with a valve chamber having a conduit connected with the branched conduit in the aforesaid block, said valve chamber having seats at opposite sides thereof, a double seated valve adapted to be operated to selectively close the aforesaid seats, a port leading from the master cylinder to said valve chamber between said seats, and auxiliary ports in said valve chamber block arranged outwardly from said seats and adapted to communicate alternately with the valve chamber upon the operation of the valve.

2. A safety device for branched hydraulic systems, comprising the combination with a master cylinder and branch pressure services, of a block having a conduit connected with the master cylinder, said block having a plurality of branch openings leading from said conduit, a plurality of cylinders rigidly mounted in said block and each having its inner end communicating with the master cylinder through one of said branch openings, the outer ends of said cylinders being each connected with one of the service branches, pistons operative one in each of said cylinders and adapted to close off the service branch connected with said cylinder on the excessive reduction of pressure therein, ports arranged adjacent to the inward ends of each of said cylinders communicating with a common return conduit connected with the aforesaid block conduit, a check valve permitting outflow of fluid pressure from said return conduit to the block conduit and preventing entrance of pressure from the first-mentioned conduit, and means connected with said block for controlling the flow of pressure fluid to the first-mentioned conduit therein and to the cylinders connected therewith.

3. In a control device of the class described, in combination, a main body having a fluid supply passage, a common pressure relief passage paralleling said supply passage, a plurality of cylinders radiating from said passages each communicating with the fluid supply passage at the inner end and each having a port opening therefrom intermediate of the length, all of said ports being connected to said common relief passage, means forming a non-return connection from said common pressure relief passage to said fluid supply passage, and pistons in said cylinders cooperating with said ports, said cylinders being adapted for connection to service branches.

4. A control device as claimed in claim 3 in which said block is provided with oppositely paired shallow threaded bores presenting bottom seating faces, the cylinders being threaded into said bores and sealingly engaging said faces at the inner end, said fluid supply passage having oppositely paired ports opening into the respective paired cylinders, oppositely paired ports opening from said pressure relief passage through said seating faces, said cylinder ports having passages leading through the walls of said cylinders and registering with said last-mentioned paired ports.

5. In a safety device for hydraulic pressure systems, the combination with a master cylinder and branch hydraulic leads, a plurality of cylinders one connected with each branch, means forming a common connection between said master cylinder and the cylinders connected to said branches, of pistons mounted one in each of said branch cylinders adapted to individually close the branch leading from the cylinder upon the abnormal reduction of pressure within said branch, said pistons each being formed with an orifice leading from the master cylinder connection and terminating in a bleed orifice the outer end of which is offset from alignment with the branch lead from the cylinder and sealed by contact with the end of the cylinder, and a check valve arranged in the piston orifice adapted to close the entrance of said orifice against the backflow of pressure through the bleed orifice.

CRICHTON W. HAGGART.